United States Patent [19]
Jurrens

[11] 3,900,694
[45] Aug. 19, 1975

[54] HOT MELT ADHESIVE CONTAINING AMORPHOUS POLYPROPYLENE

[75] Inventor: Lawrence D. Jurrens, Bartlesville, Okla.

[73] Assignee: Phillips Petroleum Company, Bartlesville, Okla.

[22] Filed: Aug. 30, 1972

[21] Appl. No.: 284,836

Related U.S. Application Data

[63] Continuation of Ser. No. 148,221, May 28, 1971.

[52] U.S. Cl.......... 428/513; 260/27 R; 260/28.5 A; 260/897 A
[51] Int. Cl............................................. B32b 21/06
[58] Field of Search......... 260/897 A, 27 R, 28.5 A; 161/270

[56] References Cited
UNITED STATES PATENTS

| | | | |
|---|---|---|---|
| 3,220,966 | 11/1965 | Flanagan | 260/897 C |
| 3,271,340 | 9/1966 | Shearer | 260/897 A |
| 3,278,646 | 10/1966 | Lambert | 260/897 A |
| 3,361,849 | 1/1968 | Cramer | 260/897 A |
| 3,492,372 | 1/1970 | Flanagan | 260/27 R |
| 3,567,487 | 3/1971 | Poppe | 260/27 R |

Primary Examiner—Joseph L. Schofer
Assistant Examiner—Paul R. Michl

[57] ABSTRACT

Hot melt adhesive composition with high softening temperatures are prepared from a mixture of amorphous polypropylene having a molecular weight range of 500 to 15,000, an olefin copolymer of 95 to 98 percent by weight propylene and 5 to 2 percent by weight ethylene, and a polyterpene tackifier. The improved hot melt adhesive formulation can contain from about 25 to about 35 percent by weight amorphous polypropylene, from about 35 to about 45 percent by weight of the olefin copolymer and from about 20 to about 40 percent by weight of a polyterpene tackifier and is particularly useful for sealing folding cartons and corrugated paperboard cartons.

7 Claims, No Drawings

HOT MELT ADHESIVE CONTAINING AMORPHOUS POLYPROPYLENE

This is a continuation application of our copending application having Ser. No. 148,221, filed May 28, 1971 now abandoned.

BACKGROUND OF DISCLOSURE

This invention is related to hot melt adhesive compositions. In another aspect, this invention is related to hot melt adhesives having high softening temperatures. In still another aspect, it is related to the adhesion of porous substrates using a hot melt adhesive. In still another aspect, it is related to hot melt adhesive formulations based on amorphous polypropylene.

A hot melt adhesive melts sharply upon heating and flows freely for easy application to the substrate which is to be bonded. Hot melt adhesives are not dependent on cross-linking or other chemical reactions to produce a bond between the substrate materials. The bond is produced upon cooling and is dependent upon the penetration of the surface of the substrate. These adhesives are particularly useful in bonding paper, plastics, textiles, wood and other porous materials. Hot melt adhesives are particularly useful for sealing folding cartons and in the production of corrugated paperboard cartons. High bond strength under conditions of high humidity and extremes of temperature which are often encountered in transportation and storage is of particular value in a hot melt adhesive used in the production or sealing of cartons.

Hot melt adhesive formulations based on a variety of polymers and copolymers have come into prominence in several recent developments, but many of these known formulations suffer from the disadvantage of having a very low softening temperature of the order of 80° to 90°C, i.e., below the boiling point of water.

Accordingly, I have now discovered useful hot melt adhesive formulations based on the combination of a low molecular weight amorphous polyproylene and a resinous olefin copolymer of propylene and ethylene. These hot melt adhesive formulations have a softening point of above 140°C, which means that contact with very hot water or even wet steam will not destroy the seal produced between substrates by adhesives of this formulation.

Accordingly, an object of this invention is to provide a hot melt adhesive with superior resistance to high temperature loss of strength.

Another object of this invention is to provide hot melt adhesive compositions which possess flexibility and strength under widely varying conditions of temperature.

Yet another object of this invention is to provide hot melt adhesive compositions which will adhere to a wide variety of porous substrates.

Other aspects, objects, as well as the several advantages of this invention will be apparent to those skilled in the art upon reading the specification and the appended claims.

SUMMARY OF THE INVENTION

In accordance with this invention, hot melt adhesive compositions with superior resistance to high temperature loss of strength are prepared by combining amorphous polypropylene having a molecular weight of 500 to 15,000, an olefin copolymer of 95 to 98 percent by weight propylene and 5 to 2 percent by weight ethylene and a polyterpene tackifier. I have found that the compositions of my invention can be heated to temperatures up to 145°C without adhesive failure. Thus, compositions are provided which have the distinct advantage of high temperature strength needed in certain applications.

In an embodiment of this invention, it has been found that the use of amorphous polypropylene having a molecular weight in the range of 500 to 1,500 produces an adhesive of very low viscosity which has the added advantage of being able to be applied with greater facility to substrate at lower temperature than the compositions containing higher molecular weight amorphous polypropylene.

The propylene-ethylene copolymer suitable for this invention is a crystalline, random copolymer containing from 95 to 98 percent by weight propylene and from 5 to 2 percent by weight ethylene having a melt flow in the range of 250–350 (ASTM D 1238-65T, Condition L). Preferably the copolymer contains from 2 to 3-1/2 percent by weight ethylene. The copolymer makes up about 35 to 45 weight percent of the hot melt adhesive composition. In a preferred embodiment the copolymer ranges from 38 to 42 percent by weight of the hot melt adhesive composition.

The noncrystalline polypropylene suitable for this invention is soluble in hydrocarbon solvents such as pentane, hexane and other hydrocarbons at the boiling point, generally has a crystallinity of less than 5 percent and a molecular weight of about 500 to about 15,000; it has been found that using a noncrystalline polypropylene having a molecular weight in the range of 500 to about 1,500 produces an adhesive in a desirable low viscosity range. The composition containing the lower molecular weight amorphous polypropylene has a Brookfield Viscosity in the range of 4 to 2.9 cps × $10^{-3}$ in a range of 176 to 189°C as compared to a Brookfield Viscosity of 6.2 to 4.5 cps × $10^{-3}$ in the same range of temperature for a composition containing amorphous polypropylene of 8,000 average molecular weight. The noncrystalline polypropylene makes up from about 25 to about 35 percent by weight of the hot melt adhesive composition with a preferred range of about 28 to about 32 percent by weight amorphous polypropylene.

A polyterpene is added to the hot melt adhesive formulation in amounts in the range of 20 to 40 percent by weight as a tackifying agent. In a preferred embodiment polyterpene is added in amounts ranging from 25 to 35 percent by weight of the total formulation. Although other plasticizers could be incorporated for this purpose it has been found that a thermoplastic hydrocarbon resin such as Tenneco Chemical's "Nirez 1135," a polyterpene, is well suited for use in this invention.

An antioxidant or antioxidant formulation can be added to the hot melt adhesive composition if desired. A finite amount of antioxidant up to about 0.1 weight percent of the total of the copolymer and amorphous polypropylene constituents has been found to be effective. A formulation consisting of one part tetrakis[methylene(3,5-di-t-butyl-4-hydroxyhydro-cinnamate)]methane, three parts dilaurylthiodipropionate, and two parts Dalpac R, a butylated hydroxytoluene produced commercially by Hercules Inc., has been found to be a particularly effective antioxidant.

Mixing the components can be carried out in any suitable manner which continues the mixing at a temperature elevated sufficiently to maintain the components in a molten state until the adhesive composition is homogeneous. Satisfactory mixing can be accomplished with a heated blade mixer or in a container maintained in an oil bath at a temperature between 390° and 455°F. The following examples of the formulation of the adhesive of this invention, the description of the test procedures, and the data derived therefrom are meant to be exemplary and are not exclusive.

EXAMPLE I

The formulations prepared consisted of 40 percent crystalline propylene-ethylene copolymer, melt flow 308 (ASTM D 1238-65T, Condition L), 30 percent by weight amorphous polypropylene, and 30 percent by weight polyterpene tackifier. The propylene-ethylene copolymer was made by visbreaking a propyleneethylene copolymer having a melt flow of 4 to a melt flow of 308 (as determined by ASTM D-1238-65T, Condition L). The crystalline copolymer of propylene and ethylene contained about 97 percent by weight propylene and about 3 percent by weight ethylene. The polyterpene tackifier used was Nirez 1135 produced by Tenneco Chemical. When added, the amount of antioxidant was 0.1 percent based on the crystalline propylene-ethylene copolymer plus the amorphous polypropylene. The antioxidant consisted of one part tetrakis[-methylene(3,5-di-t-butyl-4-hydroxyhydrocinnamate)]methane, two parts of a commercially obtained butylated hydroxytoluene, and three parts dilaurylthiodipropionate. The tackifier, amorphous polypropylene, and the antioxidant were melted in a stainless steel beaker heated in an oil bath at 204°C for 30 minutes; the crystalline polypropylene-ethylene copolymer was added with agitation during the following 45 minutes and final blending to homogeneity required an additional 45 minutes with agitation. Formulations were prepared in which the amorphous propylene polymer had an average molecular weight of 7,500 (Formulation A) and in which the amorphous propylene polymer had an average molecular weight of 800 (Formulation B).

EXAMPLE II

A Nordson hot melt applicator, Model II, was used to test the performance of the hot melt adhesive compositions of this invention and the control compositions in machinability and bond strength. The applicator is equipped with a large drum 12 inches wide and 39 inches in circumference which is then covered with Kraft paper. The molten adhesive is extruded from a nozzle to the drum applying either an intermittent or continuous bead of the adhesive to the substrate. To make this useful for producing laminations, a modification was added so that two rolls of paper and a nip roller complemented the large drum. By varying the drum speed and raising or lowering the nozzle above the substrate, the length of time between application of adhesive to one substrate and application of the other substrate could be varied. Since it was desired that paper laminates be prepared at higher application temperatures than the 210°C maximum hose temperature of the commercial Nordson hot melt applicator a modification of the applicator was adapted for some of the runs. This modification consisted of adding a one-liter reactor equipped with an air-driven stirring motor, electric heating mantle, thermocouples, and a stainless steel line with valve from the bottom of the reactor to the wheel laminating assembly, all of which was installed on a stand directly above the drum.

A comparison of the bond strength of the adhesive compositions of this invention are compared with the bond strength of a commercially available amorphous polypropylene based hot melt adhesive in the data shown below in Table I. This also illustrates the improved bond strength at low pull speeds of laminates produced by bonding two strata with the hot melt adhesive of this invention. Paper-adhesive-paper laminates are illustrated but any porous strata can be laminated in the same manner. A laminate comprising several strata can also be produced.

TABLE I

Bond Strengths of Paper/Paper Laminates

| Adhesive Composition | Applicator | | | Bond Strength[1] | |
|---|---|---|---|---|---|
| | Type | Line, °C | Drum Speed rpm | 10"/min | o.2"/min |
| Amorphous polypropylene avg. MW 7,500, crystalline polypropylene-ethylene copolymer, polyterpene (Formulation A) | modified Nordson[2] | 232 | 45 | P.T.[3] (0.64)[4] | P.T. (0.50) |
| | modified Nordson[2] | 232 | 9 | P.T. (1.25) | F.T. (0.88) |
| Amorphous polypropylene avg. MW 800, crystalline polypropylene-ethylene copolymer, polyterpene (Formulation B) | modified Nordson | 193 | 45 | F.T. (1.85) | F.T./A.F. (0.80) |
| | modified Nordson[2] | 193 | 9 | F.T./A.F. (1.55) | A.F. (0.09) |
| | Nordson | 193 | 45 | P.T. (1.64) | F.T./P.T. (1.08) |
| | Nordson | 193 | 9 | P.T. (1.19) | F.T./P.T. (1.08) |
| Amorphous polypropylene avg. MW 30,000, based commerical adhesive | Nordson | 171 | 45 | P.T./F.T. (1.31) | A.F. (0.14) |
| | Nordson | 171 | 9 | F.T./C.F. (1.42) | A.F. (0.12) |

[1]ASTM D 1876-61T
[2]Containing means to facilitate use of adhesive mixtures at temperatures higher than 210°C
[3]P.T.=paper tear, F.T.=fiber tear, A.F.=adhesive failure, C.F.=cohesive failure [4]lbs/inch width In the modified applicator with a line temperature of 232°C and at drum speeds of 45 and 9 rpm, paper tear or fiber tear was obtained when the laminates were pulled in the Instron testing machine at crosshead speeds of 10 inches and 0.2 inch per minute thus indicating excellent adhesion to paper. The formulations prepared in which amorphous propylene polymer having an average molecular weight of 800 was substituted for the amorphous polypropylene having an average molecular weight of 7,500 produced an adhesive of advantageously low viscosity which also showed good bond strength. In contrast to the excellent adhesion of paper to paper observed with the adhesive of this invention, the commercial hot melt adhesive based on an amorphous polypropylene with an average molecular weight of 30,000 showed good bond strength when pulled at 10 inches per minute but poor bonding at the lower crosshead speed of 0.2 inch per minute.

TABLE II

Softening Points of Hot Melt Adhesive Formulations

| Adhesive Composition | Softening Point, °C | |
|---|---|---|
| | Ball and Ring | Static Load |
| Amorphous polypropylene avg. MW 7,500, crystalline polypropylene-ethylene copolymer, polyterepene | 146 | 149 |
| Amorphous polypropylene avg. MW 800, crystalline polypropylene-ethylene copolymer, polyterpene | 144 | 156 |
| Amorphous polypropylene avg. MW 30,000 based commercial adhesive | 92 | 80 |
| Ethylene-vinyl acetate/wax/tackifier* | 66 | 58 |

*Formulated with 40 parts Elvax 150, 30 parts Staybelite Ester 10, and 30 parts paraffin wax.

In the table above adhesive softening points of the compositions of this invention are compared with the softening points of a commercial amorphous polypropylene based adhesive and a standard ethylene-vinyl acetate based hot melt adhesive. The temperature at which measurable softening and flow of the hot melt adhesive occurs defines the upper limit at which adhesive will be effective. Since melting occurs over a range of temperature, it is difficult to measure exactly. The test employed to determine this value was ASTM D 36–66T, (Ball and Ring Apparatus). The compositions of this invention showed a softening point 42°C higher than the commercial amorphous polypropylene based adhesive and 78°C higher than the ethylene-vinyl acetate formulation.

Another test employed to determine softening temperature is the Static Load Test. In this test two one-inch wide paper strips are bonded with a one-inch overlap, resulting in a one square inch bond area. Duplicate samples are suspended in an oven and a 250 gram load added. The temperature of the oven is raised incrementally at 30 minute intervals. When the bond fails, the temperature is recorded. The results of this test are considered to more nearly represent the maximum performance temperature of a hot melt adhesive. It must be noted that the compositions of this invention showed an increased performance advantage over the commercially available material using this test as compared with the Ball and Ring test.

Reasonable variation and modification are possible within the scope of the foregoing disclosure, and the appended claims to the invention the essence of which is that there has been provided a hot melt adhesive composition with high softening temperature based on a mixture of amorphous polypropylene, an olefin copolymer of crystalline propylene and ethylene, and a polyterpene tackifier.

I claim:

1. A laminate exhibiting good bond strength at crosshead speeds of 0.2 inches per minute as tested by ASTM D 1876-61T comprising at least two porous strata bonded by a distinct interlayed stratum of a hot melt adhesive consisting of (1) 25 to 35 percent by weight amorphous polypropylene having a molecular weight range of 500 to 15,000; (2) 35 to 45 percent by weight of crystalline olefin copolymer of 95 to 98 percent by weight polypropylene and 5 to 2 percent by weight ethylene; and (3) 40 to 20 percent by weight of a polyterpene tackifier.

2. A laminate of claim 1 wherein the porous strata are paper.

3. A laminate according to claim 1 wherein the hot melt adhesive composition contains an antioxidant formulation in the range of up to 0.1 percent by weight of the total weight of the total of amorphous polypropylene crystalline olefin copolymer.

4. A laminate of claim 1 wherein said amorphous polypropylene has a molecular weight in the range of about 500 to about 1500.

5. A laminate of claim 1 wherein said amorphous polypropylene has a molecular weight in the range of about 1,500 to about 15,000.

6. A laminate of claim 1 wherein the hot melt adhesive consists of 28 to 32 percent by weight amorphous polypropylene; 38 to 42 percent by weight of a crystalline olefin copolymer of 95 to 98 percent by weight propylene and 5 to 2 percent by weight ethylene; and 35 to 25 percent by weight polyterpene tackifier.

7. A laminate of claim 1 wherein the hot melt adhesive consists of 30 percent by weight amorphous polypropylene, 40 percent by weight of a crystalline copolymer of about 97 percent by weight propylene and about 3 percent by weight ethylene; and 30 percent by weight polyterpene tackifier.

* * * * *